United States Patent
Woodruff et al.

(10) Patent No.: US 10,007,643 B2
(45) Date of Patent: Jun. 26, 2018

(54) ROBUST REGRESSION ANALYSIS TECHNIQUES USING EXPONENTIAL RANDOM VARIABLES

(71) Applicant: International Business Machines Corporation, Armonk, NY (US)

(72) Inventors: David P. Woodruff, Mountain View, CA (US); Qin Zhang, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1090 days.

(21) Appl. No.: 14/246,174

(22) Filed: Apr. 7, 2014

(65) Prior Publication Data

US 2015/0286612 A1 Oct. 8, 2015

(51) Int. Cl.
  *G06F 19/00* (2018.01)
  *G06F 17/18* (2006.01)
  *G06F 11/30* (2006.01)

(52) U.S. Cl.
  CPC .................................. *G06F 17/18* (2013.01)

(58) Field of Classification Search
  CPC ...................................................... G06F 17/18
  See application file for complete search history.

(56) References Cited

U.S. PATENT DOCUMENTS 7,395,250 B1 7/2008 Aggarwal et al.
8,352,215 B2 1/2013 Chen et al.
2012/0143799 A1* 6/2012 Wilson ............... G06K 9/6228
  706/12
2013/0013275 A1* 1/2013 Natarajan ............. G06F 17/18
  703/2

OTHER PUBLICATIONS

Grace Period Disclosure—David P. Woodruff, Qin Zhang, "Subspace Embeddings and Ip-Regression Using Exponential Random Variables", submitted May 23, 2013 (v1), last revised Mar. 17, 2014 (v2); 27 pages.
Mitra, Kaushik et al., "Analysis of Sparse Regularization Based Robust Regression Approaches", IEEE Transactions of Signal Processing, vol. 61, No. 5, Mar. 1, 2013, pp. 1249-1257.
Mitra, A., "Robust Estimation in Regression Using an Adaptive Approach", Computer Statistics Quarterly 2, 1988, pp. 143-155.
Rossceuw, Peter, J., et al., "Robust regression with a disturbed intercept using least median of squares", Computational Statistics & Data Analysis 17 (1994), pp. 65-76.
Mastronardi et al.; "Fast robust regression algorithms for problems with Toeplitz structure"; Computational Statistics and Data Analysis, vol. 52, No. 2, pp. 1119-1131; 2007.

* cited by examiner

*Primary Examiner* — Phuong Huynh
(74) *Attorney, Agent, or Firm* — Cantor Colburn LLP (57) ABSTRACT

Embodiments relate to methodologies and program product is provided for conducting regression analysis. In one embodiment the method includes obtaining data related to a statistical process including a plurality of points in a plurality of dimensions and organizing the plurality of points and the plurality of dimensions in a matrix. The method also includes calculating a vector of a particular measurement such that the measurement equal the number of the plurality of points and calculating a least absolute deviation by determining the number of non-zero entries provided in the matrix.

16 Claims, 2 Drawing Sheets

ROBUST REGRESSION ANALYSIS TECHNIQUES USING EXPONENTIAL RANDOM VARIABLES

STATEMENT REGARDING PRIOR DISCLOSURES BY THE INVENTOR OR A JOINT INVENTOR

The following disclosure(s) are submitted under 35 U.S.C. 102(b)(1)(A): David P. Woodruff, Qin Zhang, "Subspace Embeddings and $l_p$-Regression Using Exponential Random Variables", submitted May 23, 2013 (v1), last revised Mar. 17, 2014 (v2); 27 pages.

BACKGROUND

The present disclosure relates generally to regression analysis techniques and more particularly to regression analysis techniques using exponential random variables.

In statistics, regression analysis provides a statistical process for estimating the relationships among variables. These relationships can be used to establish techniques for modeling and analyzing several variables at once. The focus of such analysis is based on the relationships existing between a dependent variable and one or a plurality of independent variables. Therefore, regression analysis is useful in understanding how values of the dependent variables change when any one of the independent variables is changed especially when other independent variables are held at a constant.

Embedding can be also used to aid regression analysis. In mathematics, an embedding is where a mathematical structure is contained within another group that is in turn a subgroup. An embedding can provide a one-to-one function that is a homeomorphism onto its image. An "oblivious subspace embedding" (OSE) is a type of embedding that provides distribution over matrices S such that for any low-dimensional subspace V, with high probability over the choice of S, $\|Sx\|_2$ approximately equals $\|x\|_2$ (up to 1+eps multiplicative error) for all x in V simultaneously.

Oblivious subspace embeddings have proven to be an essential ingredient for quickly and approximately solving numerical linear algebra problems such as used in regression analysis. Prior art provides that such embeddings could be used to approximately solve least squares regression and low rank approximation time. OSE can also be used for speeding up algorithms for several numerical linear algebra problems. Problems that benefit from OSE's may include approximate least squares regression, low-rank approximation, approximating leverage scores, and constructing good preconditioners. A precondition can be defined as a condition or predicate that must always be true. In computing environments, a precondition must be true prior to the execution of some section or all areas of the code or before an operation in a formal specification. Traditionally, if a precondition is violated, the effect of the calculation in statistical data or execution of the code in computing environments becomes undefined and thus may or may not carry out its intended work.

BRIEF SUMMARY

Methodologies and program product is provided for conducting regression analysis. In one embodiment the method includes obtaining data related to a statistical process including a plurality of points in a plurality of dimensions and organizing the plurality of points and the plurality of dimensions in a matrix. The method also includes calculating a vector of a particular measurement such that the particular measurement equals the number of the plurality of points and calculating a least absolute deviation by determining the number of non-zero entries provided in the matrix. The regression analysis is then performed and analysis estimates provided based on the calculated absolute value deviation Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Figure 1:
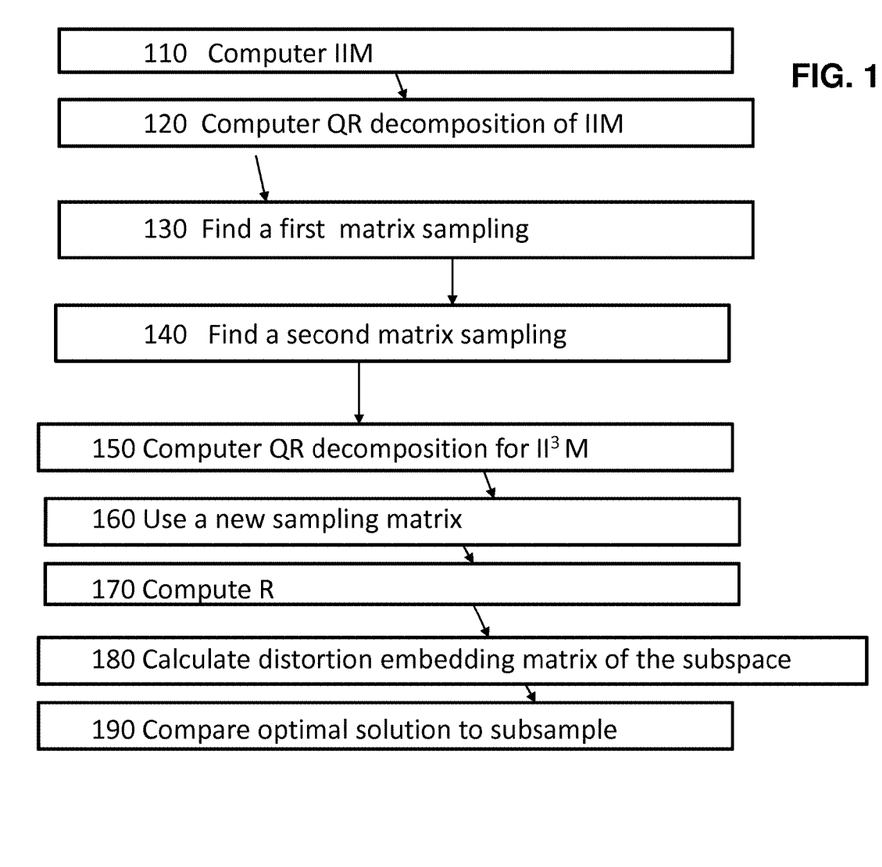
FIG. 1 depicts a flow analysis in accordance with an embodiment.

FIG. 1 provides a flow diagram associated with one embodiment of the present invention. FIG. 1 along with discussions provided presently provides one or more techniques for presenting a quick and robust solution to regression analysis problems. Such regression problems (also known as absolute deviation regression) may involve oblivious subspace embedding (OSE). In one embodiment, the solution is provided by exponential random variables and is designed to be less sensitive to outliers than square regression solutions.

In one embodiment of the present invention, an optimized technique for providing a low-distortion oblivious subspace embedding is provided. An example of this is provided and will be discussed in conjunction with results for $p \in [1,2)$. In this embodiment, the results will be referenced as IIM and can be computed in $O(nnz(M))$ time, assuming that $nnz(M) \geq d^{\omega+\gamma}$ where $\omega<3$ is the exponent of matrix multiplication and $\gamma$ is an arbitrarily small constant.

In one embodiment, a matrix $\Pi \in R^{O(d^{1+\gamma}) \times n}$ ($\gamma$ is an arbitrary small constant) for $1 \leq p < 2$ such that given $M \in R^{n \times d}$, with constant probability is calculated such that:

$$\Omega(1/(d \log d)^{1/p}) \cdot \|Mx\|_p \leq \|\Pi Mx\|_2 \leq O((d \log d)^{1/p}) \cdot \|Mx\|_p, \forall x \in R^d.$$

Similarly, a matrix $\Pi \in R^{O(d \log d) \times n}$ can be calculated such that given $M \in R^{n \times d}$, with constant probability:

$$\Omega(1/(d \log d)) \cdot \|Mx\|_1 \leq \|\Pi Mx\|_1 \leq O(d \log d) \cdot \|Mx\|_1, \forall x \in R^d.$$

In order to provide the solutions as discussed above, certain concepts relating to oblivious subspace embedding (OSE) should be discussed. An oblivious subspace embedding with distortion is a distribution over linear maps $S: R^n \to R^t$ for which for any fixed d-dimensional subspace of $R^n$, represented as the column space of an n×d matrix M and with constant probability $\|Mx\|_p \leq \|SMx\|_p \leq \kappa \|Mx\|_p$ that is provided simultaneously for all vectors $x \in R^d$. The goal is to minimize t, κ, and the time to compute S. M. Here for an n-dimensional vector $\upsilon$, $\|\upsilon\|_p = (\Sigma_{i=1}^{n} |\upsilon_i|^p)^{1/p}$ is the p norm.

Oblivious subspace embedding (OSE) provide a quickly way to approximately solving numerical linear algebra problems especially when solving least squares regression and low rank approximation. Optimizations can be made to streaming models that make this possible. For example, in a least squares regression problem, a matrix M with n×d contents is usually over-constrained (i.e., n»d, as well as a vector $b \in \mathbb{R}^n$. The goal is to output $x^* = \text{argmin}_x \|Mx-b\|_2$ that is, to find the vector $x^*$ so that $Mx^*$ is the (Euclidean) projection of b onto the column space of M. This example can be solved in $O(nd^2)$ time by computing the normal equations. Prior art provides solutions so that a vector $x^*$ can be found with $\|Mx'-b\|_2 \leq (1+\epsilon) \|Mx^*-b\|_2$ in $O(nd \log d) + \text{poly}(d/\epsilon)$ time, providing substantial improvement. The application of oblivious subspace embeddings is immediate: given M and b, compute SM and Sb, and solve the problem $\min_x \|SM_x - Sb\|2$. If $\kappa = (1+\epsilon)$ and t«n, then a relative error approximation value can be obtained by solving a much smaller instance of regression.

The bottleneck of these algorithms for $l_p$-regression was a preprocessing step, in which one first well conditions the matrix M by choosing a different basis for its column space. Some prior art got around this for the important case of p=1 by designing an oblivious subspace embedding S for which $\|Mx\|_1 \leq \|SMx\|_1 \leq d \log d |M|x|_1$ in which S has $O(d \log d)$ rows. In such a case, S was chosen to be a matrix of Cauchy random variables. (A Cauchy distribution is defined as one that has the probability density function of $f(x; 0,1) = 1/(\pi(1+x^2))$.) The key point of the embedding is that one can instead run the expensive conditioning step on the matrix SM, which is much smaller than M, obtaining a d×d change of basis matrix $R^{-1}$. Then one can show the matrix $SMR^{-1}$ is well-conditioned. This reduced the running time for $l_1$-regression to $nd^{\omega-1} + \text{poly}^{(d/\epsilon)}$, where ω<3 is the exponent of matrix multiplication. The dominant term is the $nd^{\omega-1}$, which is just the cost of computing SM when S is a matrix of Cauchy random variables. However, the prior art solution is inefficient and is also limited in terms of values it can accommodate.

A more structured family of subspace embeddings can be provided by improving the running time for $L_1$-regression to $O(nd \log n) + \text{poly}^{(d/\epsilon)}$. An alternate construction will provide a family of subspace embeddings that was obtained by partitioning the matrix M into n/poly(d) blocks. Using this approach, it is also possible to obtain an $O(nd \log n) + \text{poly}^{(d/\epsilon)}$ time algorithm for $L_p$-regression for every $1 \leq p \leq \infty$.

The results discussed are suitable for dense matrices, but they are not optimal if the number of non-zero entries of M, denoted nnz(M), is much smaller than nd. Indeed, in practical applications M is often a sparse matrix, and one could hope to achieve a running time of $O(\text{nnz}(M)) + \text{poly}^{(d/\epsilon)}$. A family of sparse oblivious subspace embeddings S with $\text{poly}^{(d/\epsilon)}$ rows, for which $\|Mx\|_2 \leq \|SMx\|_2 \leq (1+\epsilon) \|Mx\|_2$ for all x. Importantly, the time to compute SM is only nnz(M), that is, proportional to the sparsity of the input matrix. The $\text{poly}^{(d/\epsilon)}$ factors can be optimized in this way. Combining this idea with the partitioning of M into blocks in the FCT2, they were able to achieve a running time of $O(\text{nnz}(M) \log n) + \text{poly}^{(d/\epsilon)}$ for $l_p$-regression for any constant p, $1 \leq p \leq \infty$. Table 1 can be used to demonstrate the results achieved using this approach.

In Table 1, the $L_1$ oblivious subspace embeddings is provided for a transform with properties of ω<3 as the exponent of matrix multiplication, where γ is an arbitrarily small constant. In this embodiment, the distortion $\tilde{O}(d^3)^1$ is optimal for p=1, provided that IIM can be computed in O(nnz(M)) time. The result is provided as a function of the distortion

TABLE 1

Results for $L_1$ oblivious subspace embeddings

|  | Time | Distortion | Dimemsion |
| --- | --- | --- | --- |
| [17] | ndω−1 | $\tilde{O}(d)$ | $\tilde{O}(d)$ |
| [5] | ndlogd | $\tilde{O}(d^{2+\gamma})$ | $\tilde{O}(d^5)$ |
| [7] + [14] | nnz(M)logn | $\tilde{O}(d^{(x+1)/2})$ (x ≥ 1) | $\tilde{O}(n/d^x)$ |
| [7] + [5] + [14] | nnz(M)logn | $\tilde{O}(d^3)$ | $\tilde{O}(d)$ |
| [7] + [17] + [14] | nnz(M)logn | $\tilde{O}(d^{1+\omega/2})$ | $\tilde{O}(d)$ |
| [12] | nnz(M) | $\tilde{O}(d^3)$ | $\tilde{O}(d^5)$ |
| [12] + FJLT | nnz(M) + $\tilde{O}(d^6)$ | $\tilde{O}(d^3)$ | $\tilde{O}(d)$ |
| This paper | nnz(M) + $\tilde{O}(d^{\omega+\gamma})$ | $\tilde{O}(d^2)$ | $\tilde{O}(d)$ |

The results as provided further shows that numerical values are improved in respect to $\tilde{O}(d^2)$. Previous results for $L_1$ oblivious subspace embeddings can be compared to what is provided in Table 1. This shows that the OSE results under this one embodiment lead to an improvement of $(1+\epsilon)$-approximation (results for $L_p$ regression for every $p \in [1,2]$). One numerical example can now be provided: for an $L_p$ regression problem specified by $M \in R^{n \times (d-1)}$, $b \in R^n$ and p, let $M^- = [M, -b] \in R^{n \times d}$. In addition, let $\varphi(t,d)$ be the time of solving $L_p$ regression problem on t vectors in d dimensions. Using the embodiment discussed, an algorithm for $L_p$ ($1 \leq p < 2$) regression can be obtained with running time $$O(\text{nnz}(\overline{M}) \log n + d^{7-p/2} \log^{3-p/2} d + \varphi(O(d^{2+p} \log(1/\epsilon)\epsilon^2), d)).$$

One technique used in the prior art for achieving $O(\text{nnz}(M) \log n) + \text{poly}(d)$ time for $L_p$-regression with t=poly(d) sketching dimension has the form S·D·M, where S is a t×n hashing matrix, that is, a matrix for which in each column there is a single randomly positioned entry which is randomly either 1 or −1, and D is a diagonal matrix of p-stable random variables. p-stable random variables have the property that if X and Y are independent p-stable random variables, then for scalars a and b, aX+aY is distributed as $(|a|^p + |b|^p)^{1/p} Z$, where Z is itself a p-stable random variable. For p=2, they are Gaussian random variables, while for p=1 they are Cauchy random variables.

One inherent limitation with using p-stable random variables is that in analyses of them for regression [5,12,17], one needs to bound the concentration of $|X|^p$, the p-th power of the absolute value of a p stable random variable. To upper bound the distortion of the embedding, one needs to bound $\Pr[|X|^p > t \text{ median}(|X|^p)]$, while to lower bound the distortion one needs to bound $\Pr[|X|^p < 1/t \text{ median}(|X|^p)]$, for t≥1. The smaller these bounds, the smaller the distortion is of the embedding. For p-stable random variables for $1 \leq p < 2$, both of these bounds are $\Omega(1/t)$, which means $|X|^p$ is heavy-tailed in both directions.

In the present embodiment, a starting point for improving these sketches is to use exponential random variables instead of p-stable random variables. Exponential random variables have stability properties with respect to the minimum operation, that is, if are exponentially distributed and $\lambda_i > 0$ are scalars, than $\min\{u_1/\lambda_1, \ldots, u_n/\lambda_n\}$ is distributed as $u/\lambda$, where $\lambda = \Sigma_i^p \lambda_i$. This property can also be used to estimate the harmonic mean of n numbers and for estimating the p-norm for p>2. By replacing the diagonal matrix D in the prior art, for $L_p$-regression with a diagonal matrix with 1/p diagonal entries $1/u_i$ for independent exponential random variables $u_1, \ldots, u_n$, the sketch coincides with that of sketching dimension t.

By using random variables $1/u_i^{1/p}$ on the diagonal, the restriction of p-stable random variables in the context of regression can be bypassed. In the analysis for regression, the concentration of $X^p=1/u$ can be provided, where u is an exponential random variable. While $Pr[X^p > t \cdot median(X^p)]$ is still $\Omega(1/t)$, now $Pr[|X|^p < 1/t \cdot median(X^p)]$ is only $\exp(-t)$, that is, the lower tail is exponentially small. This property ultimately leads to an improved distortion bound for $L_p$ subspace embeddings into $L_p$ for $p \in [1,2)$, and in turn the improved running time for $L_p$-regression for $p \in [1,2)$. The use of exponential random variables requires $p \geq 2$ since the variance of $1/u^{1/p}$ does not exist unless $p > 2$ and he embeds vectors into $L_\infty$ with constant distortion, while the analysis for $p \in [1,2)$ instead embeds vectors into $L_2$ with a distortion that depends on the dimension of the underlying subspace. To prove this works, the fact that S provides a subspace embedding for $L'_2$ can be shown as provided in FIG. 1 and further optimized in [12,14]. The low dimensional $L'_2$ space is then embedded into $L_1$ in a variety of ways as known by those skilled in the art such as through the use of a Fast Johnson Lindenstrauss Transform. (In mathematics, the Johnson-Lindenstrauss lemma concerning low-distortion embeddings of points from high-dimensional into low-dimensional Euclidean space.) This illustrates the versatility of exponential random variables.

In another embodiment, given a matrix $M \in R^{n \times d}$, if $M_1, \ldots, M_d$ are the columns of M, and $M^1, \ldots, M^n$ are the rows of M. then $l_i = \|M^i\|_p$ $(i=1, \ldots, n)$ can be defined as the leverage scores of M. Consider, range $(M) = \{y|y=Mx, x \in R^d\}$. In addition, w.l.o.g., as will be discussed below, $\|x\|_1 = 1$, $x \in R^d$; by scaling the results such that it will hold for all $x \in R^d$. Define $\|M\|_p$ to be the element-wise $L_p$ norm of M. That is, $\|M\|_p = (\Sigma_{i \in [d]} \|M_i\|_p^p)^{1/p} = (\Sigma_{j \in [n]} \|M^j\|_p^p)^{1/p}$.

Well-Conditioning of A Matrix—The following definitions can be used in the well conditioning of matrices.

Definition 1—$((\alpha,\beta,p)$-well-conditioning—Given a matrix $M \in R^{n \times d}$ and $p \in [1,\infty)$, let q be the dual of p, that is, $1/p + 1/q = 1$. In this case, the first formula is derived in the following manner if M is $(\alpha,\beta,p)$-well-conditioned:

$$\|x\|_q \leq \beta \|Mx\|_p \text{ for any } x \in R^d, \text{ and} \quad (1)$$

$$kMk_p \leq \alpha. \text{ Define } \Delta_p'(M) = \alpha\beta. \quad (2)$$

It is well known that for a d-dimensional subspace $(R^n, \|\cdot\|_p)$ is $(d^{1/p}, 1, p)$-well-conditioned. Thus by definition, $\|x\|_q \leq \|Ax\|_p$ for any $x \in R^d$, and $kAk_p \leq d^{1/p}$. In addition, the definition provides for the property that $\|A\|k_p = 1$ for all $i \in [d]$.

Definition 2 ($l_p$-conditioning)—Given a matrix $M \in R^{n \times d}$ and $p \in [1,\infty)$, let $\zeta_p^{max}(M) = \max_{\|x\|_2 \leq 1} \|Mxk_p$ and $\zeta_p^{min}(M) = \min_{\|x\|_2 \geq 1} \|Mx\|_p$. Define $\Delta_p(M) = \zeta_p^{max}(M)/\zeta_p^{min}(M)$ to be the $L_u$-norm condition number of M. The following lemma states the relationship between the two definitions.

Lemma 1—Given a matrix $M \in R^{n \times d}$ and $p \in [1,\infty)$, $$d^{-|1/2-1/p|}\Delta_p(M) \leq \Delta_p'(M) \leq d^{\max\{1/2,1/p\}}\Delta_p(M).$$

Oblivious Subspace Embeddings—To design an oblivious subspace embedding (OSE), given a parameter d for a distribution D over $m \times n$ matrices (such that for any d-dimensional subspace $S \subset R^n$, with probability 0.99 over the choices of $\Pi \sim D$), the following formula can be used for all $x \in S$, $$1/2 \cdot \|x\|_2 \leq \|\Pi x\|_2 \leq 3/2 \cdot \|x\|_2.$$

In this example, the OSE's only works for the 2-norm, but as can be appreciated similar results can be achieved for $L_p$-norms for all $p \in [1,\infty)\setminus\{2\}$. Two important parameters needs to be minimized in this case in the construction of OSE's. These are:

1. The number of rows of $\Pi$, that is, m. This is the dimension of the embedding.
2. The number of non-zero entries in the columns of $\Pi$, denoted by s. This affects the running time of the embedding.

In several OSE constructions, in particular, where it is shown that there exist OSE's with $(m,s)=O(d^2)$, 1) and $(m,s)=(O(d^{1+\gamma}), O(1))$ this will be true for any constant $\gamma > 0$.

Distributions—In order to address the problems and subsequently solutions related to distributions of functions, the following discussion will be helpful. Given two variables X, Y, then it is true that $X \simeq Y$ if X and Y have the same distribution. In addition, for p-stable Distribution, then a distribution $D_p$ is p-stable, if for any n dimensional vector $\alpha = (\alpha_1, \ldots, \alpha_n) \in R_n$ and $X_1, \ldots, X_n \overset{i.i.d.}{\sim} D_p$, $$\Sigma_{i \in [n]} \alpha_i X_i \simeq \|\alpha\|_p)X,$$

where $X \sim D_p$. It is well-know that p-stable distribution exists if and only if $p \in [1,2]$. For $p=2$ it is the Gaussian distribution and for $p=1$ it is the Cauchy distribution. A random variable X is p-stable if X is chosen from a p-stable distribution.

Exponential Distributions merit their own discussion. An exponential distribution has support $x \in [0,\infty)$, probability density function (PDF) $f(x) = e^{-x}$ and cumulative distribution function $F(x) = 1 - e^{-x}$. A random variable X is exponential if X is chosen from the exponential distribution. There are several properties relating to exponential distributions that need to be addressed:

Property 1—The exponential distribution has the following properties.
1. (max stability) If $u_1, \ldots, u_n$ are exponentially distributed, and $\alpha_i > 0$ $(i=1, \ldots, n)$ are real numbers, then $$\max\{\alpha_1/u_1, \ldots, \alpha_n/u_n\} \simeq (\Sigma_{i \in [n]} \alpha_i)/u$$

where u is exponential.
2. Lower tail bound—for any X that is exponential, for a large enough constant $C_0$, $$Pr[X \leq t] \leq c_0 t, \text{ for } \forall t \geq 0.$$

Property 2—The second property holds since the median of the exponential distribution is a constant $\ln 2$ (that is, $Pr[x \leq \ln 2] = 50\%$), and the PDFs on $x=0$, $x=\ln 2$ are $f(0)=1$, $f(\ln 2)=\frac{1}{2}$, differing by a factor of 2. Given two random variables X,Y chosen from two probability distributions $X \succeq Y$, if for $\forall t \in R$ then $Pr[X \geq t] \geq Pr[Y \geq t]$. The following lemma shows a relationship between the p-stable distribution and the exponential distribution.

Lemma 2—For any $p \in [1,2)$, there exists a constant $\kappa_p$ such that $$|X_p| \succeq \kappa_p \cdot 1/U^{1/p},$$

where $X_p$ is p-stable and U is an exponential. In other words, if $X_p$ is p-stable with $p \in [1,2)$, then $$Pr[X > x] \sim c_p x^{-p},$$

for some constant $c_p$ when $x \to \infty$. By Property 1 if U is exponential, then $$Pr[1/U^{1/p} > x] = Pr[U < 1/x^p] \leq c_0 x^{-p},$$

for some constant $c_0$. Therefore there exists a constant $\kappa_p$ such that $|X_p| \succeq \kappa_p \cdot 1/U^{1/p}$.

It should be noted that in the discussion presented here, to aid understanding, several events $E_0, E_1, \ldots$ (along their analysis) are defined such that each of those events holds with probability 0.99, and there are no more than 10 of them. Thus by a union bound all of them hold simultaneously with probability 0.9. This is so that those conditions will not affect the analysis. However, it is appreciated by those skilled in the art that other arrangements can be provided in alternative embodiments and this is only used to achieve understanding and clarity.

Subspace Embedding—It is important that the topic of subspace embedding will now be discussed in relation to its different components. First, the algorithm itself should be provided. The subspace embedding matrix $\Pi=SD$ is provided such that D is an n×n diagonal matrix with $1/u_1^{1/p}, \ldots, 1/u_n^{1/p}$ on the diagonal, where $u_i$ (i=1, ..., n) are i.i.d. exponentials. In this example, S is chosen to be an (m,s)-OSE with $(m,s)=O(d^{1+\gamma})$, O(1)) ($\gamma$ is an arbitrary small constant). More preciously, the first pick random hash functions is h: $[n]\times[s]\to[m/s]$, $\sigma:[n]\times[s]\to\{-1,1\}$. For each $(i,j)\in[n]\times[s]$ $S_{(j-1)s+h(i,j),i}=\sigma(i,j)/\sqrt{s}$ where $\sqrt{s}$ is just a normalization factor.

Consequently, the following theorem can be proven:

Theorem 1—Let A be the basis of a d-dimensional subspace of $(\mathbb{R}^n, \|\cdot\|_p)$. Given the above choices of S and D, let $\Pi=SD\in R^{O(d1+\gamma)\times n}$. For any $1\leq p<2$:

$$\Omega(1/(d\log d)^{1/p})\cdot\|Ax\|_p\leq\|\Pi Ax\|_2\leq O((d\log d)^{1/p})\cdot\|Ax\|_p,$$
$$\forall x\in\mathbb{R}^d.$$

Again, since the inequality holds for all $x\in R^d$, the theorem holds if the basis is replaced by any full-rank matrix M in d-dimensional subspace of $(R^n, \|\cdot\|_p)$.

By observing that $\|\Pi Ax\|_2\leq\|\Pi Ax\|_p\leq d^{(1+\gamma)(1/p-1/2)}\|\Pi A\|_{k_2}$ for $p\in[1,2)$, Theorem 1 directly implies the following.

Corollary 1—Under the same assumptions as Theorem 1, for any $1\leq p<2$ $$\Omega(1/(d\log d)^{1/p})\cdot\|Ax\|_p\leq\|\Pi Ax\|_2\leq O(d^{(1+\gamma)(1/p-1/2)}(d\log d)^{1/p})\cdot\|Ax\|_p, \forall x\in\mathbb{R}^d$$

where $\gamma$ is an arbitrary small constant. This can be further improved for the distortion for p=1 by pre-multiplying a Fast Johnson-Lindenstrauss Transform (FJLT) matrix proposed.

Lemma 3—Given a fixed set X of $2^{ck}$ vectors in $R^t$ (c is a universal constant), there exists a FJLT matrix $\Phi: R^t\to R^k$ such that for all $x\in X$, for both $p\in\{1,2\}$, $\alpha_p\|x\|_2/2\leq\|\Phi x\|_p\leq2\alpha_p\|x\|_2$, where: $\alpha_1=k\sqrt{2\pi^{-1}}$ and $\alpha_2=k$. The sketch can be computed in time $O(tk^{\omega-1})$. By a net-argument like before, and setting $k=\Theta(d\log d)$, one can show that $\alpha_1\|x\|_2/2\leq k\Phi xk_1\leq2\alpha_1\|x\|_2$ holds for all $x\in R^d$. Now combining this with Theorem 1, theorem 2 can be obtained.

Theorem 2—Let M be a full-rank matrix in a d-dimensional subspace of $(\mathbb{R}^n, \|\cdot\|_1)$. Given the above choices of S and D, let $H=SD$.

$$\Omega(1/(d\log d)\cdot\|Mx\|_1\leq\|\Phi\Pi Mx\|_1\leq O(d\log d)\cdot\|Mx\|_1,$$
$$\forall x\in\mathbb{R}^d.$$

The embedding matrix $\Phi\Pi$ can be computed in time $O(nnz(M)+d^{\omega+\gamma}\log d)$, where $\gamma$ is an arbitrary small constant. In one example, given the embedded matrix $\Phi\Pi$, the distortion for p=1 is tight up to a factor of $\tilde{\Theta}(\sqrt{d})$ The worst case M is the same as the "bad" example before where the $M=(I_d,0)^T$ and $I_d$ is the d×d identity matrix. Lemma 3 provides $$\|\Phi\Pi Mx\|_1 = \theta(k)\cdot\|\Pi Mx\|_2.$$

Suppose that the top d rows of M get perfectly hashed, then $$\|\Pi Mx\|_2=(\Sigma_{i\in[d]}(x_i/u_i)^2)^{1/2}$$

where $u_i$ are i.i.d. exponentials. Let $i^*=\text{argmax}_{i\in[d]} 1/u_i$. It is known from Property 1 that with a constant probability, $1/u_{i^*}=\Omega(d)$. Now if x is chosen such that $X_{i^*}=1$ and $x_i=0$ for all $i\neq i^*$, then $k\Pi xk_2=d$. On the other hand, with a constant probability, for $\Omega(d)$ of $i\in[d]$, $1/u_i=\Theta(1)$. Let $K(|K|=\Omega(d))$ denote this set of indices. If x is chosen such that $$x_1 = 1/|K| \text{ for all } i \in K \text{ and } x_1 = 0 \text{ for all } i \in [d]\setminus|K|,$$
$$\text{then } \|\Pi Mx\|_2 = 1/\sqrt{|K|} = O(1/\sqrt{d}).$$

Therefore the distortion is at least $\Omega(d^{3/2})$. Theorem 1 can be proven as well. If $E_0$ is defined to be the event that $\|SDAx\|_2=(1\pm\frac{1}{2})\|DAx\|_2$ which is conditioned on. By this choice of S, $E_0$ holds with probability 0.99. The global parameter is set as $\rho=c_1 d\log d$.

The formulas and calculations discussed so far do not provide an overestimation. This is can be easily ascertained by looking at $$S = \frac{1}{\sqrt{s}}(S_1, \ldots, S_s)^T,$$

where each $S_i\in R^{(m/s)\times n}$ with one ±1 on each column. For any $x\in R^d$, let $y=Ax\in R^n$. Let $D^0\in R^{n\times n}$ be a diagonal matrix with i.i.d. p-stable random variables on the diagonal. Let $E_1$ be the event that for all $i\in[s]$, $\|S_iD^0y\|_p\leq c_4(d\log d)^{1/p}\cdot\|y\|_p$ for all y E ran (A) where $C_4$ is some constant. Since s=O(1) and are independent. By the previous discussion, it is known that $E_1$ holds with probability 0.99.

$$\begin{aligned}\|SDy\|_2 &\leq 3/2\cdot\|Dy\|_2 \text{ (conditioned on } \varepsilon_0) \quad (1)\\ &\leq 3/2\cdot\kappa_p\|D'y\|_2 \text{ (Lemma 2)}\\ &\leq 3\cdot\kappa_p\|SD'y\|_2 \text{ (conditioned on } \varepsilon_0)\\ &\leq 3\cdot\kappa_p\|SD'y\|_p\\ &\leq 3\cdot\kappa_p\cdot\frac{1}{\sqrt{5}}\sum_{i=1}^{5}\|S_iD'y\|_p \text{ (triangle inequality)}\\ &\leq 3\cdot\kappa_p\cdot\frac{1}{\sqrt{5}}\cdot 5\cdot c_4(d\log d)^{1/p}\cdot\|y\|_p \text{ (conditioned on } \varepsilon_1)\\ &\leq c_5(d\log d)^{1/p}\cdot\|y\|_p, \quad (s=O(1), \kappa_p=O(1))\end{aligned}$$

where $c_5$ is a sufficiently large constant.

Similarly there is also no underestimation because For any $x\in\mathbb{R}^d$, let $y=Ax\in\mathbb{R}^n$.

$$\begin{aligned}\|SDy\|_2 &\geq \frac{1}{2}\cdot\|Dy\|_2 \text{ (conditioned on } \varepsilon_0)\\ &\geq \frac{1}{2}\cdot\|Dy\|_\infty\\ &\geq \frac{1}{2}\cdot 1/\rho^{1/p}\cdot\|y\|_p. \quad (2)\end{aligned}$$

The last inequality holds with probability $(1-e^{-P})$, since $\|Dy\|_\infty \sim \|y\|_p/u^{1/p}$ where u is an exponential, and $\Pr[u \geq \rho] \leq e^{-\rho}$ for an exponential.

Similar as before, a net-argument can be used. Let ball $B = \{y \in R^n | y = Ax, \|y\|_p \leq 1\}$.

Let $B_\epsilon \subseteq B$ be an $\epsilon$-net of B with size at most $(3/\epsilon)^d$. If the choice is made that $\epsilon = 1/(4c_5(\rho d^2 \log d)^{1/p})$, then probability $1 - e^{-\rho} \cdot (3/\epsilon)^d \geq 0.99$, $\|SDy'\|_2 \geq 1/(2\rho^{1/p}) \cdot \|y'\|_p$ holds for all $y' \in B_\epsilon$. Let $\epsilon_2$ denote this event which is conditioned for $y \in B \backslash B_\epsilon$, let $y' \in B_\epsilon$ such that $\|y - y'\|_p \leq \epsilon$. By the triangle inequality $$\|SDy\|_2 \geq \|SDy'\|_2 - \|SD(y-y')\|_2. \quad (3)$$

$$\|SD(y-y')\|_2 \leq c_5(d \log d)^{1/p} \cdot \|y-y'\|_p \quad (4)$$
$$\leq c_5(d \log d)^{1/p} \epsilon$$
$$\leq c_5(d \log d)^{1/p} \epsilon \cdot d^{1/p} \|y\|_p$$
$$= 1/(4\rho^{1/p}) \|y\|_p.$$

By (2) (3) ad (4), conditioned on $\epsilon_2$, we have for all $y \in \text{range}(A)$, it holds that $$\|SDy\|_2 \geq 1/(2\rho^{1/p}) \cdot \|y\|_p - 1/(4\rho^{1/p}) \|y\|_p \geq 1/(4\rho^{1/p}) \|y\|_p. \quad (5)$$

Regression—In one embodiment, the prior discussion can be applied t regression.

Lemma 4—Given a matrix $M \in R^{n \times d}$ with full column rank and $p \in [1, \infty)$, it takes at most $O(nd^3 \log n)$ time to find a matrix $R \in R^{d \times d}$ such that $MR^{-1}$ is $(\alpha, \beta, p)$-well-conditioned with $\alpha\beta \leq 2d1 + \max\{\frac{1}{2}, 1/p\}$.

Lemma 5—Given a matrix $M \in \mathbb{R}^{n \times d}$, $p \in [1, \infty)$, $\epsilon > 0$, and a matrix $R \in R^{d \times d}$ such that $MR^{-1}$ is $(\alpha, \beta, p)$-well-conditioned, it takes $O(nnz(M) \cdot \log n)$ time to compute a sampling matrix $\Pi \in R^{t \times n}$ such that with probability 0.99:

$$(1-\epsilon)\|Mx\|_p \leq \|\Pi Mx\|_p \leq (1+\epsilon)\|Mx\|_p, \forall x \in \mathbb{R}^d.$$

t is $O((\alpha\beta)^p d \log(1/\epsilon)/\epsilon^2)$ for $1 \leq p < 2$ and $O((\alpha\beta)^p d^{p/2} \log(1/\epsilon)/\epsilon^2)$ for $p > 2$.

Lemma 6—Given an $l_p$ regression problem specified by $M \in R^{n \times (d-1)}$, $b \in R^n$, and $p \in [1, \infty)$, let $\Pi$ be a $(1 \pm \epsilon)$-distortion embedding matrix of the subspace spanned by M's columns and b from Lemma 5, and let $\hat{x}$ be an optimal solution to the sub-sampled problem $\min_{x \in R}d \| \Pi Mx - \Pi b k_p$. Then $\hat{x}$ is a $$\frac{1+\epsilon}{1-\epsilon}$$

approximation solution to the original problem.

Lemma 7—Given $M \in R^{n \times d}$ with full column rank, $p \in [1, 2)$, and $\Pi \in R^{m \times n}$ whose entries are i.i.d. p-stables, if $m = cd \log d$ for a sufficiently large constant c, then with probability 0.99:

$$\Omega(1) \cdot \|Mx\|_p \leq \|\Pi Mx\|_p \leq O((d \log d)^{1/p} \cdot \|Mx\|_p, \forall x \in \mathbb{R}^d.$$

In addition, $\Pi M$ can be computed in time $O(nd^{\omega-1})$ where $\omega$ is the exponent of matrix multiplication.

Lemma 8—Let $\Pi \in R^{m \times n}$ be a subspace embedding matrix of the d-dimensional normed space spanned by the columns of matrix $M \in R^{n \times d}$ such that $$\mu_1 \cdot \|Mx\|_p \leq \|\Pi Mx\|_2 \leq \mu_2 \cdot \|Mx\|_p, \forall x \in \mathbb{R}^d. \quad (6)$$

If R be the "R" matrix in the QR-decomposition of $\Pi M$, then $MR^{-1}$ is $(\alpha, \beta, p)$-well-conditioned with $\alpha\beta \leq d^{1/p}\mu_2/\mu_1$ for any $p \in [1, 2)$.

$$\|MR^{-1}x\|_p \leq 1/\mu_1 \cdot \|\Pi MR^{-1}x\|_2 \text{ (by (6))}$$
$$= 1/\mu_1 \cdot \|Qx\|_2 \text{ } (\Pi MR^{-1} = QRR^{-1} = Q)$$
$$= 1/\mu_1 \cdot \|x\|_2 \text{ (Q has orthonormal columns)}$$

And $$\|MR^{-1}x\|_p \geq 1/\mu_2 \cdot \|\Pi MR^{-1}x\|_2 \text{ (by (6))}$$
$$= 1/\mu_2 \cdot \|Qx\|_2$$
$$= 1/\mu_2 \cdot \|x\|_2$$

Then by Lemma 1 it holds that $$\alpha\beta = \Delta_p'(MR^{-1}) \leq d^{\max\{1/2, 1/p\}} \Delta_p(MR^{-1}) = d^{1/p}\mu_2/\mu_1.$$

Theorem 3—There exists an algorithm that given an $L_p$ regression problem specified by $M \in R^{n \times (d-1)}$, $b \in R^n$ and $p \in [1, 2)$, with a constant probability computes a $(1+\epsilon)$-approximation to an $L_p$ regression problem in time $O(nnz(\overline{M}) \log n + d^{7-p/2} \log^{3-p/2} d + \phi(O(d^{2+p} \log(1/\epsilon)/\epsilon^2), d))$, where $M^- = [M, -b]$ and $\varphi(t, d)$ is the time to solve $l_p$-regression problem on t vectors in d dimensions. In order to provide a proof of this, let $\Pi$ be the subspace embedding matrix. By theorem:

$$(\mu_1, \mu_2) = (\Omega(1/(d \log d)^{1/p}), O((d \log d)^{1/p})).$$

In one embodiment, as provided in FIG. 1, for $1 \leq p < 2$) as shown in block 110 first $\Pi M$ is computed. In block 120, the QR decomposition is computed for $\Pi M$ such that $R \in R^{d \times d}$ is the "R" in the QR-decomposition. In block 130, Given R, Lemma 5 is used to find a sampling matrix $\Pi^1 \in R^{t1 \times n}$ such that $$(1-\frac{1}{2}) \cdot \|\overline{M}x\|_p \leq \|\Pi^1 \overline{M}x\|_p \leq (1+\frac{1}{2}) \cdot \|\overline{M}x\|_p, \forall x \in \mathbb{R}^d. \quad (7)$$

In block 140, the Lemma 7 is used to compute a matrix $\Pi^2 \in R^{t2 \times t1}$ for $\Pi^1 M^-$ such that $$\Omega(1) \cdot \|\Pi^1 \overline{M}x\|_p \leq \|\Pi^2 \Pi^1 \overline{M}x\|_p \leq O((d \log d)^{1/p}) \cdot \|\Pi^1 \overline{M}x\|_p,$$
$$\forall x \in \mathbb{R}^d.$$

Let $\Pi^3 = \Pi^2 \Pi^1 \in R^{t2 \times n}$. By (7) and $kzk_2 \leq kzk_p \leq m^{1/p - 1/2} kzk_2$ for any $z \in R^m$, then $$\Omega(1/t_2^{1/p - 1/2}) \cdot \|\overline{M}x\|_p \leq \|\Pi^3 \overline{M}x\|_2 \leq O((d \log d)^{1/p} \cdot \|\overline{M}x\|_p,$$
$$\forall x \in \mathbb{R}^d.$$

In block 150, the QR-decomposition of $\Pi^3 M$ is computed so that $R_1 \in R^{d \times d}$ be the "R" in the QR-decomposition.

In block 160, given $R_1$, Lemma 5 is used to find a sampling matrix $\Pi^4 \in R^{t3 \times n}$ such that $\Pi^4$ is a $(1 \pm \frac{1}{2})$ distortion embedding matrix of the subspace spanned by $M^-$. In block 170, Lemma 4 is used to compute a matrix $R_2 \in R^{d \times d}$ such that $\Pi^4 MR_2^{-1}$ is $(\alpha, \beta, p)$-well-conditioned with $\alpha\beta \leq 2d1 + 1/p$. Finally, in block 180, Given $R_2$, Lemma 5 is used to find a sampling matrix $\Pi^5 \in R^{t4 \times n}$ such that $\Pi^5$ is a $(1 \pm \epsilon)$ distortion embedding matrix of the subspace spanned by $M^-$.

In block 190, $\hat{X}$ is computed which is the optimal solution to the sub-sampled solution $\min_{x \in \mathbb{R}^d} \|\Pi^5 Mx - \Pi^5 b\|_p$. In one embodiment, the correctness of the algorithm is guaranteed by Lemma 6. Now for analyzing the running time, block 110 calculated traditionally can costs time $O(nnz(M^-))$, by choice of $\Pi$. Block 120 costs time $O(md^2) = O(d^{3+\gamma})$ using standard QR-decomposition, where $\gamma$ is an arbitrarily small constant. Block 130 costs time $O(nnz(^M) \log n)$ by Lemma 5, giving a sampling matrix $\Pi^1 \in R^{t1 \times n}$ with $t_1 = O(d^4 \log^2 d)$. Block 140 costs time $O(t_1 d^{\omega-1}) = O(d^{3+\omega} \log^2 d)$ where $\omega$ is the exponent of matrix multiplication, giving a matrix $\Pi^3 \in R^{t2 \times n}$ with $t_2 = O(d \log d)$. Block 150 costs time $O(t_2 d^2) = O(d^3 \log d)$. Step 6 costs time $O(nnz(M^-) \log n)$ by Lemma 5, giving a sampling matrix $\Pi^4 \in R^{t3 \times n}$ with $t_3 = O(d^{4-p/2}$ $\log^{2-p/2} d$). Block 170 costs time $O(t_3 d^3 \log t_3) = O(d^{7-p/2} \log^{3-p/2} d)$. Block 180 costs time $O(nnz(M^-) \log n)$ by Lemma 5, giving a sampling matrix $\Pi^5 \in \mathbb{R}^{t_4 \times n}$ with $t_4 = O(d^{2+p} \log(1/\epsilon)/\epsilon^2)$. Block 190 costs time $\varphi(t_4, d)$, which is the time to solve $L_p$-regression problem on $t_4$ vectors in $d$ dimensions. To sum up, the total running time is $$O(nnz(\overline{M}) \log n + d^{7-p/2} \log^{3-p/2} d + \varphi(O(d^{2+p} \log(1/\epsilon)/\epsilon^2), d)).$$

However, in an algorithm together as suggested in the embodiments above and along with several variants for $L_1$ regression as proposed, all running times are improved especially when in the form of $O$ $nnz^{(M)} \log n + poly(d) + \phi(O(poly(d) \log(1/\epsilon)/\epsilon^2), d))$. Among all those variants, the power of $d$ in $poly(d)$ (ignoring log factors) in the second term is at least 7, and the power of $d$ in $poly(d)$ in the third term is at least 3.5. In addition, in the proposed techniques and using the algorithms as suggested both terms get improved.

Figure 2:
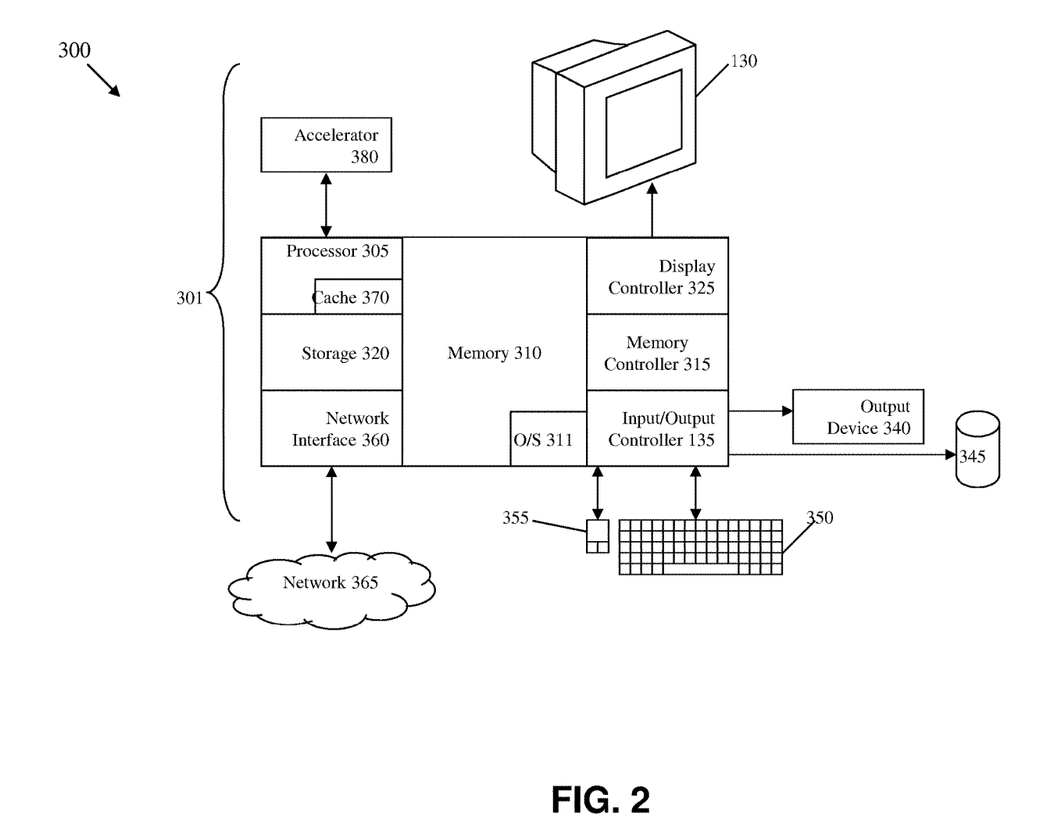
FIG. 2 depicts a block diagram of a computer system for practicing the teachings herein according to an embodiment.

Referring now to FIG. 2, a block diagram of an exemplary computer system 300 for use with the teachings herein is shown. The methods described herein can be implemented in hardware software (e.g., firmware), or a combination thereof. In an exemplary embodiment, the methods described herein are implemented in hardware, and is part of the microprocessor of a special or general-purpose digital computer, such as a personal computer, workstation, minicomputer, or mainframe computer. The system 300 therefore includes general-purpose computer 301.

In an exemplary embodiment, in terms of hardware architecture, as shown in FIG. 2, the computer 301 includes a processor 305, memory 310 coupled via a memory controller 335, a storage device 320, and one or more input and/or output (I/O) devices 340, 345 (or peripherals) that are communicatively coupled via a local input/output controller 335. The input/output controller 335 can be, for example, but not limited to, one or more buses or other wired or wireless connections, as is known in the art. The input/output controller 335 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The storage device 320 may include one or more hard disk drives (HDDs), solid state drives (SSDs), or any other suitable form of storage.

The processor 305 is a computing device for executing hardware instructions or software, particularly that stored in memory 310. The processor 305 can be any custom made or commercially available processor, a central processing unit (CPU), an auxiliary processor among several processors associated with the computer 301, a semiconductor based microprocessor (in the form of a microchip or chip set), a macroprocessor, or generally any device for executing instructions. The processor 305 may include a cache 370, which may be organized as a hierarchy of more cache levels (L1, L2, etc.).

The memory 310 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, and/or other types of storage media. Note that the memory 310 can have a distributed architecture, where various components are situated remote from one another, but can be accessed by the processor 305.

The instructions in memory 310 may include one or more separate programs, each of which comprises an ordered listing of executable instructions for implementing logical functions. In the example of FIG. 2, the instructions in the memory 310 include a suitable operating system (OS) 311. The operating system 311 essentially controls the execution of other computer programs and provides scheduling, input-output control, file and data management, memory management, and communication control and related services.

In an exemplary embodiment, a conventional keyboard 350 and mouse 355 can be coupled to the input/output controller 335. Other output devices such as the I/O devices 340, 345 may include input devices, for example but not limited to a printer, a scanner, microphone, and the like. Finally, the I/O devices 340, 345 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 300 can further include a display controller 325 coupled to a display 330. In an exemplary embodiment, the system 300 can further include a network interface 360 for coupling to a network 365. The network 365 can be an IP-based network for communication between the computer 301 and any external server, client and the like via a broadband connection. The network 365 transmits and receives data between the computer 301 and external systems. In an exemplary embodiment, network 365 can be a managed IP network administered by a service provider. The network 365 may be implemented in a wireless fashion, e.g., using wireless protocols and technologies, such as Wi-Fi, WiMax, etc. The network 365 can also be a packet-switched network such as a local area network, wide area network, metropolitan area network, Internet network, or other similar type of network environment. The network 365 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 301 is a PC, workstation, intelligent device or the like, the instructions in the memory 310 may further include a basic input output system (BIOS) (omitted for simplicity). The BIOS is a set of essential routines that initialize and test hardware at startup, start the OS 311, and support the transfer of data among the storage devices. The BIOS is stored in ROM so that the BIOS can be executed when the computer 301 is activated.

When the computer 301 is in operation, the processor 305 is configured to execute instructions stored within the memory 310, to communicate data to and from the memory 310, and to generally control operations of the computer 301 pursuant to the instructions. In exemplary embodiments, the computer system 300 includes one or more accelerators 380 that are configured to communicate with the processor 305. The accelerator 380 may be a field programmable gate array (FPGA) or other suitable device that is configured to perform specific processing tasks. In exemplary embodiments, the computer system 300 may be configured to offload certain processing tasks to an accelerator 380 because the accelerator 380 can perform the processing tasks more efficiently than the processor 305.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of conducting regression analysis preprocessing and regression analysis on a computing system to improve approximation and reduce running time of regression analysis by the computing system based at least in part on sketching an exponential random variable, the method comprising:
performing regression analysis preprocessing by the computing system, the computing system comprising a processor, an input controller, and a storage device, wherein performing regression analysis preprocessing includes:
generating, by the processor, a matrix comprising a plurality of rows representing a plurality of points and a plurality of columns associated with dimensions of each point of the plurality of points, wherein the matrix is generated by sampling data related to a statistical process that is obtained via the input controller of the computing system and stored in the storage device of the computing system;
calculating, by the processor, a vector of a particular measurement such that the particular measurement equals the number of the plurality of points;
calculating, by the processor, a least absolute deviation by determining, by the processor, the number of non-zero entries provided in the matrix, calculating, by the processor, an exponential random variable and a decomposition associated with the exponential random variable, and sketching, by the processor, the exponential random variable; and
storing, by the processor, the generated least absolute deviation into the storage device of the computing system; and
performing regression analysis, by the processor, and generating, by the processor, analysis estimates based on the absolute value deviation that is stored in the storage device of the computing system, wherein the generated analysis estimates are stored in the storage device of the computing system.

2. The method of claim 1, wherein the matrix is defined by a first variable A and the vector is defined by second variable b wherein A is smaller than b.

3. The method of claim 2, wherein the least absolute deviation is calculated based on a regression formula $\min_x \|Ax-b\|_1$ regression for an $L_1$ regression function.

4. The method of claim 3, wherein the non-zero entries are defined as nnz(M) where the number of plurality of points are defined as n and their dimensions are defined as d.

5. The method of claim 4, wherein the least absolute deviation is calculated by taking an arbitrary constant (p) having a value of greater than or equal to 1 but less than 2 such that a relationship can be established between the statistical data points and the dimensions.

6. The method of claim 5, wherein $\min_x \|Ax-b\|_1$ is calculated by obtaining a $(1+\varepsilon)$-approximation to $l_p$-regression in $O(nnz(M)\log n)+poly(d/\varepsilon)$ time.

7. The method of claim 6, wherein nnz(M) is greater than or equal to less $d*\omega+\gamma$ where $\omega<3$ is the exponent of matrix multiplication and $\gamma$ is an arbitrarily small constant.

8. The method of claim 7, further comprising obtaining a $(1+\varepsilon)$-approximation to an $L_p$-regression used in calculation of the $l_l$ regression.

9. The method of claim 8, wherein the $l_p$-regression is calculated based on the function $O(nnz(M)\log n)+poly(d/\varepsilon)$ wherein the best known $poly(d/\varepsilon)$ factors for every $p \in [1,2)$.

10. A computer program product preprocessing and regression analysis on a computing system to improve approximation and reduce running time of regression analysis on the computing system based at least in part on sketching an exponential random variable, the computer program product comprising: a non-transitory computer readable storage medium having program code embodied therewith, the program code executable by a processor of the computing system to:
perform regression analysis preprocessing by the computing system, the computing system comprising an input controller, a storage device, and the processor, wherein performing regression analysis preprocessing includes:
generating, by the processor, a matrix comprising a plurality of rows representing a plurality of points and a plurality of columns associated with dimensions of each point of the plurality of points, wherein the matrix is generated by sampling data related to a statistical process that is obtained via the input controller of the computing system and stored in the storage device of the computing system;
calculating, by the processor, a vector of a particular measurement such that the particular measurement equals the number of the plurality of points; and
calculating, by the processor, a least absolute deviation by determining, by the processor, the number of non-zero entries provided in the matrix, calculating, by the processor, an exponential random variable and a decomposition associated with the exponential random variable and sketching the exponential random variable; and
storing, by the processor, the generated least absolute deviation into the storage device of the computing system; and
perform regression analysis and generate analysis estimates based on the absolute value deviation that is stored in the storage device of the computing system, wherein the generated analysis estimates are stored in the storage device of the computing system.

11. The computer program product of claim 10, wherein the non-zero entries are defined as nnz(M) where the number of plurality of points are defined as n and their dimensions are defined as d.

12. The computer program product of claim 11, wherein an arbitrary constant (p) is provided in the calculation of the least absolute deviation such that the constant (p) has a value greater than 1 and less than 2 ($p \in [1,2)$).

13. The computer program product of claim 12, wherein nnz(M) is greater than or equal to less $d*\omega+\gamma$ where $\omega<3$ is the exponent of matrix multiplication and $\gamma$ is an arbitrarily small constant.

14. The computer program product of claim 13, wherein the $L_p$-regression is calculated based on the function O(nnz (M)log n)+poly(d/$\epsilon$) wherein the best known poly(d/$\epsilon$) factors for every p$\in$[1,2).

15. The computer program product of claim 14, wherein the distortion of linear maps is defined by S:$\mathbb{R}^n \to \mathbb{R}^t$ for which for any fixed d-dimensional subspace of $R^n$, represented as the column space of an n×d matrix M, with constant probability $\|Mx\|_p \leq \|SMx\|_p \leq \kappa\|Mx\|_p$ simultaneously for all vectors x$\in\mathbb{R}^d$.

16. A method for solving a regression problem on a computing system to improve approximation and reduce running time of regression analysis by the computing system based at least in part on sketching an exponential random variable, the method comprising:

generating a first matrix by the computing system, the computing system comprising a processor, an input controller and a storage device, the first matrix comprising a plurality of rows representing a plurality of points (n) and a plurality of columns associated with dimensions of each point of the plurality of points, wherein the first matrix is generated by sampling data that is obtained via the input controller of the computing system, wherein the data is stored in the storage device;

calculating from the generated first matrix, by the processor, a first vector associated with the dimensions related to the number of points (n);

calculating, by the processor, a least absolute deviation by computing an exponential random variable and a decomposition associated with the exponential random variable;

generating, by the processor, a distortion embedding matrix based on sampled data for a subspace spanned by the first matrix;

generating, by the processor, a well-conditioned second matrix based on the distortion embedding matrix of the subspace spanned by the first matrix;

computing, by the processor, an optimal solution based on a sub-sampling of the distortion embedding subspace;

generating a least absolute deviation solution for the regression by sketching the exponential random variable and applying the optimal based sub-sampling of the distorted embedding to it; and storing the generated least absolute deviation solution into the storage device of the computing system.

* * * * *